United States Patent
Mercadal et al.

[11] Patent Number: 5,920,173
[45] Date of Patent: Jul. 6, 1999

[54] FEEDBACK ENHANCED ADAPTIVELY TUNED VIBRATION ABSORBER

[75] Inventors: Mathieu Mercadal, Fontenay aux Roses, France; Kelvin B. Scribner; Andreas H. von Flotow, both of Hood River, Oreg.

[73] Assignee: Applied Power Inc., Butler, Wis.

[21] Appl. No.: 08/559,518

[22] Filed: Nov. 15, 1995

[51] Int. Cl.⁶ .................................................. B64C 17/06

[52] U.S. Cl. ........................ 318/649; 180/381; 318/611; 318/606; 318/607; 318/608; 318/460

[58] Field of Search ........................... 180/381; 248/562, 248/566, 636, 638, 557; 267/140.11, 140.15; 310/51; 73/668, 663, 662; 318/611, 606, 607, 608, 623, 648, 649, 460

[56] References Cited

U.S. PATENT DOCUMENTS

| | | | |
|---|---|---|---|
| Re. 33,937 | 5/1992 | Schubert | 276/136 |
| 4,473,906 | 9/1984 | Warnaka et al. | 381/71 |
| 4,483,425 | 11/1984 | Newman | 188/378 |
| 4,562,589 | 12/1985 | Warnaka et al. | 381/71 |
| 4,724,923 | 2/1988 | Waterman | 181/208 |
| 4,821,205 | 4/1989 | Schutten et al. | 364/508 |
| 4,878,188 | 10/1989 | Ziegler | 364/724.01 |
| 4,935,651 | 6/1990 | Hong et al. | 310/51 |
| 4,969,632 | 11/1990 | Hodgson et al. | 267/140 |
| 5,000,415 | 3/1991 | Sandercock | 248/550 |
| 5,174,552 | 12/1992 | Hodgson et al. | 267/140.11 |
| 5,182,887 | 2/1993 | Uno et al. | 52/167 R |
| 5,255,764 | 10/1993 | Kurabayashi et al. | 188/380 |
| 5,332,061 | 7/1994 | Majeed et al. | 180/312 |
| 5,564,537 | 10/1996 | Shoureshi | 188/380 |
| 5,609,230 | 3/1997 | Swinbanks | 188/267 |

FOREIGN PATENT DOCUMENTS

| | | | |
|---|---|---|---|
| A-0 509 911 | 10/1992 | European Pat. Off. | F16F 15/03 |
| A-0 556 033 | 8/1993 | European Pat. Off. | E04B 1/98 |
| A-0 579 182 | 1/1994 | European Pat. Off. | B62D 33/06 |
| A-61-182112 | 1/1987 | Japan | G05D 3/00 |
| A-61-286634 | 5/1987 | Japan | F16F 15/02 |
| A-63-092851 | 9/1988 | Japan | F16F 15/02 |
| A-2 222 657 | 3/1990 | United Kingdom | F16F 15/02 |
| A-2 189 573 | 5/1990 | United Kingdom . | |
| A-2 277 360 | 10/1994 | United Kingdom | F16F 15/02 |
| WO 92/15088 | 9/1992 | WIPO . | |

OTHER PUBLICATIONS

Blaszkkeiwicz et al., Tunable Transducers as Smart MAterials, 1991 IEEE paper 91CH2817–5/91/0000–0899601.

Kienholz et al., Demonstration of Solar Array Vibration Suppression, North American Conference on Smart Structures and Materials Feb. 13–18 1994.

Hollkamp et al., A Self–Tuning Piezoelectric Vibration Absorber, 35th AIAA/ASME/AHS/ACS Structural Dynamic and Materials Conference Adaptive Structures Forum Apr. 18–22, 1994.

von Flotow et al., Adaptive Tuned Vibration Absorbers: Tuning Laws Tracking agility, Sizing, and Physical Implementations, Noise–Con 94, May 01–04, 1994.

*Primary Examiner*—William M. Shoop, Jr.
*Assistant Examiner*—Kim Lockett
*Attorney, Agent, or Firm*—Quarles & Brady

[57] ABSTRACT

An apparatus has a mass suspended between two mounting plates by a separate springs to form a resonant structure that absorbs vibration in a structural member to which the mounting plates are attached. Permanent magnets are fixed to opposite sides of the mass. A sensor produces a signal indicating the frequency of the vibration. A feedback circuit receives the signal from the sensor and produces an output signal having first component frequency which corresponds to a harmonic of the frequency of the vibration. The output signal is applied to a separate voice coil adjacent to each permanent magnet. The magnetic fields produced by the output signal flowing through the voice coils interact with the magnetic fields from the permanent magnets to generate forces that act on the mass in a manner that increases the impedance of the absorber to the vibration in the structural member.

20 Claims, 6 Drawing Sheets

FEEDBACK ENHANCED ADAPTIVELY TUNED VIBRATION ABSORBER

BACKGROUND OF THE INVENTION

The present invention relates to devices for countering vibration in structural members, such as those of an aircraft fuselage; and particularly to such devices which can be dynamically tuned to adapt performance to changes in vibration frequency.

Aircraft engines can induce significant vibration into the fuselage. In propeller powered aircraft, the propeller blades produce air pressure pulses which strike external surfaces of the airframe thereby causing a time periodic vibration of the airframe, at about 100 Hz for example. Jet engines also produce vibration in supporting members. If left unchecked, the induced vibrations create objectionable noise in the aircraft cabin, and may result in serious fatigue of the airframe.

As a consequence vibration absorbers are attached to structural members throughout the aircraft. For example, the Fokker 50 turbo prop airplane carries 150 frame-mounted absorbers. These devices typically are a simple mass-spring system in which a mass is attached to the airframe by a resilient member that acts as a spring. Elastomeric pads and metal cantilevers have been employed as the spring. The mass-spring system is fixedly tuned to resonate at the frequency of common vibrations in the structural member of the airframe to which the absorber is attached and thus optimally absorbs the vibration energy at that frequency. The absorber has a large mechanical impedance at resonance which is proportional to the quality factor Q. Absorption (mechanical impedance) at other frequencies diminishes as a function of the deviation from the absorber's resonant frequency.

A drawback of fixedly tuned absorbers is that the frequency of airframe vibrations varies with engine speed. Engine speed varies during operation, especially in the case with jet engines. Although the absorber may be tuned to the vibration frequency (e.g. 100 Hz) which occurs at the nominal cruising speed of the aircraft, less that optimal vibration absorption occurs at other engine speeds. In addition, the tuning of elastomeric type absorbers changes with the age of the elastomeric material, and both elastomeric and metal-type absorbers change their tuning with changes in temperature.

Therefore, it is desirable to provide an absorption system which is dynamically adaptive to variation of the vibration frequency. Such a dynamic system would require a controller that senses the vibration to be absorbed and produces a control signal to alter the tuning of a mechanical absorber.

SUMMARY OF THE INVENTION

An object of the present invention is to provide a system for absorbing time periodic vibrations in a structural member wherein the system is autonomously capable of adapting to variations in the vibration frequency.

Another object is to provide an electronic controller for such a vibration absorbing system in which the controller senses the vibration occurring in the structural member and tunes an absorber to the frequency of the vibration.

A further object of the present invention is to provide a controller which senses the vibration of a mass in the vibration absorber and tunes the absorber in response to a relationship between vibration of the structural member and the mass.

Yet another object is to provide a electronic enhancement to the effectiveness of the mechanical absorber at the fundamental resonant frequency and extend performance to reduce other harmonics of the vibration.

These objects are fulfilled by an absorber that has a base for attaching to a structural member and a mass coupled to the base by a spring. In the preferred embodiment, two members are provided for attachment to the body and the mass suspended between the members by a first spring connected to one first member and a second spring connected to the other member. The mass is able to oscillate transversely between the two members at a resonant frequency so that, when the resonant frequency coincides with the frequency of vibration in the structural member, the absorber acts as a large impedance to that vibration.

The enhancement comprises a magnet attached to the mass and a sensor which produces a signal indicating vibration in the structural member to which the absorber is attached. A feedback circuit receives the signal from the sensor and produces an output signal having first component frequency substantially equal to a harmonic of the frequency of vibration. As used herein the frequency of vibration in referred to as the fundamental frequency and is considered the first harmonic. The second harmonic occurs at twice the fundamental frequency, the third harmonic occurs at thrice the fundamental frequency, and so on. In the preferred embodiment, the output signal from the feedback circuit has component frequencies at the fundamental, second harmonic and third harmonic frequencies. The output signal is driven into a wire coil, applying force between the magnet and the coil and thus between the airframe and the mass. Thus the basic mechanical absorber is enhanced to reduce vibration at all those frequencies.

A conductor, which may constitute a voice coil, carries the output signal from the feedback circuit and is mounted adjacent to the magnet on the mass. The positioning of the conductor is such that an electric field produced by the output signal flowing through the conductor interacts with the magnetic field from the magnet to generate a force that acts on the mass in a manner that increases impedance of the vibration absorber to the vibrational disturbance.

DETAILED DESCRIPTION OF THE INVENTION

Figure 1:
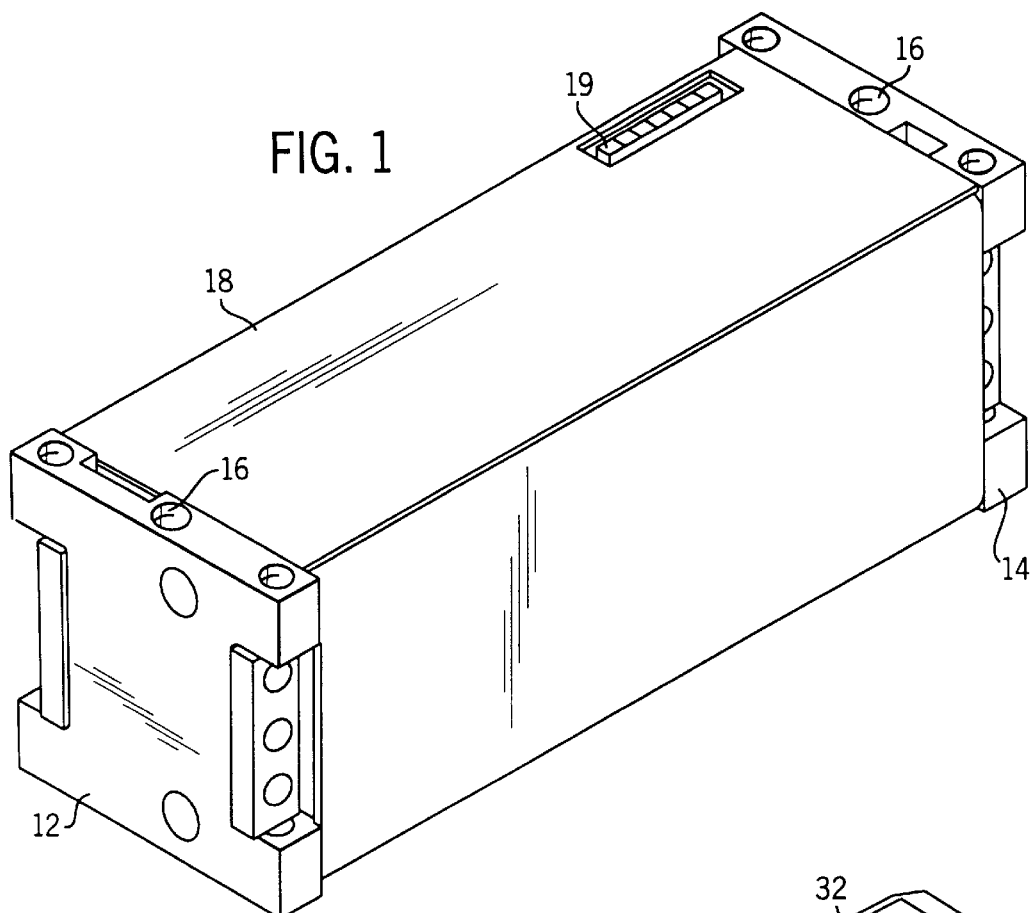
FIG. 1 is an isometric view of an enclosed vibration absorber according to the present invention.

With initial reference to FIG. 1, a vibration absorber 10 has a pair of spaced apart, I-shaped end plates 12 and 14 which combined form the base of the absorber. Each end plate has a central vertical aperture 16 extending there through for receiving a bolt to attach the vibration absorber 10 to a structural member, such as an aircraft fuselage, carrying the objectionable vibration or other disturbance. The vibration absorber reduces the vibration in the attached structural member. Once fastened to the structural member the spacing between the end plates 12 and 14 is held constant. A four sided tubular cover 18 extends between the inner surfaces of the two end plates 12 and 14. The cover 18 forms an enclosure and holds the end plates apart so that tension can be applied to internal components, as will be described. An aperture through the cover 18 provides access to an electrical connector 19.

Figure 2:
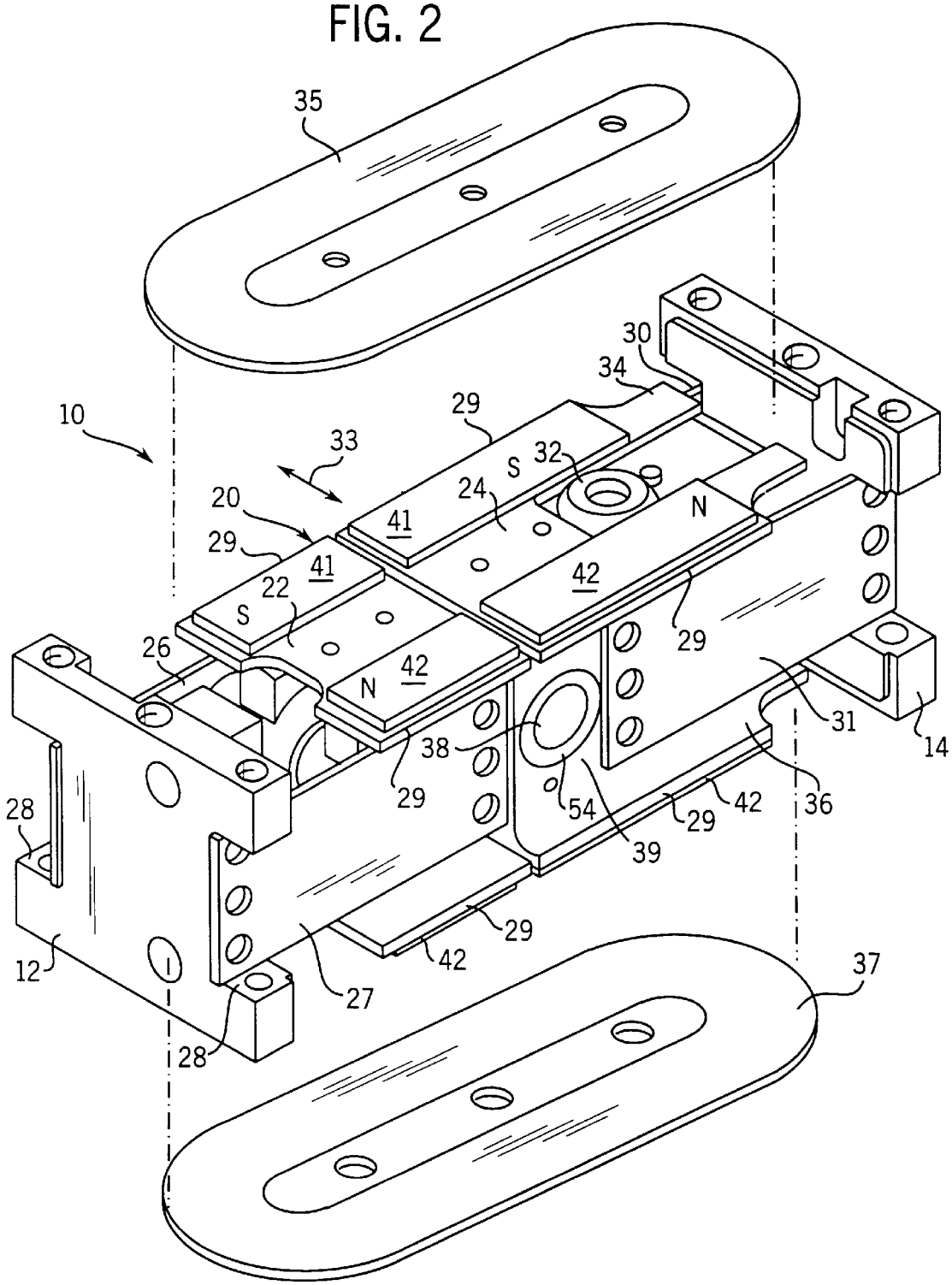
FIG. 2 is a partially exploded, isometric view of the vibration absorber with the cover removed.

With reference to FIG. 2 which shows the cover 18 removed, a proof-mass 20, comprising a slider block 22 and a driver block 24, is suspended between the two end plates 12 and 14. The slider block 22 is coupled to the first end plate 12 by a first pair of 22 flexible metal straps 26 and 27. Each metal strap 26 and 27 rests within separate side notches 28 in the I-shaped first end plate 12 and is bolted thereto. The opposite end of the two metal straps 26 and 27 are bolted to the slider block 22. Similarly, one end of each of a second pair of flexible metal straps 30 and 31 is bolted to the driver block 24, while opposite ends are bolted into side notches of the I-shaped second end plate 14. The metal straps 26, 27, 30 and 31 act as springs, or flexures, which couple the components of the proof-mass 20 to the end plates 12 and 14 in a flexible manner. Because the straps lie in parallel planes the proof-mass can oscillate transversely between the end plates along axis 33. The spring and proof-mass assembly has a resonant frequency which is a function of the mass of the proof-mass 20 and stiffness of the springs formed by the straps 26, 27, 30 and 31. The vibration absorber is mounted to the airframe so that axis 33 coincides with the axis of vibration to be absorbed. When the resonant frequency matches the frequency of the vibration, the vibration energy is absorbed by the proof-mass oscillation. Three vibration absorbers can be mounted along orthogonal axes to provide three dimensional vibration absorption.

A voice coil 35 is positioned above the proof-mass 20 and another voice coil 37 is positioned below the proof-mass in the orientation of the vibration absorber 10 shown in the drawings. Each voice coil is oval shaped having straight sections extending along and adjacent to longitudinal edges 29 of the upper and lower surfaces of the proof-mass 20. The voice coils 35 and 37 are attached to the inside surfaces of the cover 18.

Individual permanent magnets 41 and 42 are fastened to the upper and lower surfaces of proof-mass 20 along the longitudinal edges 29 and face the straight sections of an associated voice coil 35 or 37. The permanent magnets 41 and 42 have opposing magnetic poles on their upper and lower surfaces. The permanent magnets 41 and 42 are oriented so that different poles face the voice coil along opposite longitudinal edges of the upper and lower surface. For example, the south pole S of permanent magnets 41 along one longitudinal edge 29 of the upper surface of the proof-mass face the upper voice coil 35, while the north pole N of permanent magnets 42 along the opposite edge are facing the upper voice coil 35. As will be described, the electric current flowing through the voice coils 35 and 37 interacts with the magnetic field produced by the permanent magnets 41 and 42 to enhance the impedance of the proof-mass resonance to the vibrations.

The driver block 24 supports a motor assembly 32 which is captivated between an upper plate 34 and a lower plate 36 of the driver block. The driver block has sidewalls 39 with aligned apertures extending therethrough within which is received the ends of a camshaft 38 that is operated by the motor assembly.

Figure 3:
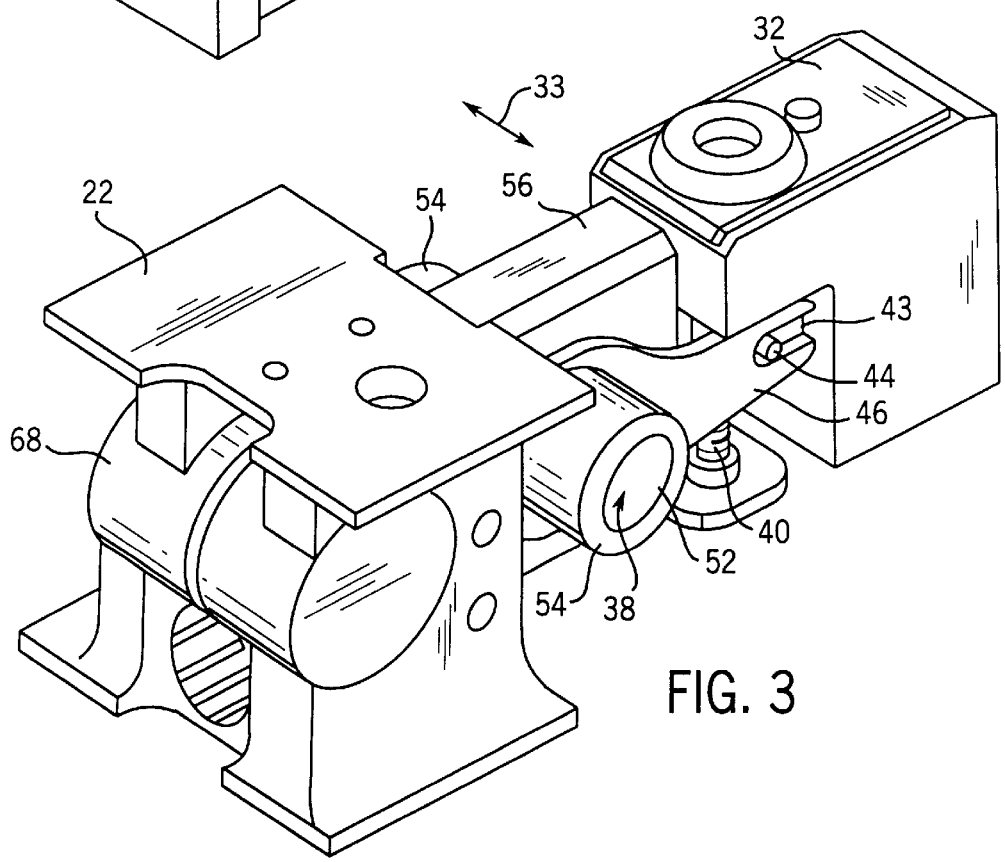
FIG. 3 is an isometric view of a subassembly of the vibration absorber shown in FIG. 1.

With reference to FIG. 3, the motor assembly 32 includes a geared transmission and may be a FPS 3002 model manufactured by Futaba Corporation of America, Irvine, Calif. USA. Alternatively a DC motor may be employed. The output of the transmission is coupled to a threaded lead screw 40. A transfer block 43 has a vertical threaded aperture through which the lead screw 40 extends and a pair of pins 44 projecting from opposite sides, with only one of the pins 44 being visible in the drawings. Each one of a pair of wrenches 46 on opposite sides of the motor assembly couple the transfer block 43 to camshaft 38.

The camshaft 38 has a cylindrical center section which is within an aperture in arm 56 which projects from the main body of the slider block 22 toward the motor assembly 32. Smaller diameter sections 52 extend from opposite ends of the camshaft center section along a common axis which is off-center with respect to the axis of the cylindrical center section. In other words, the center section of camshaft 38 is not concentric with respect to the end sections 52. Each end section 52 is received in a separate bearing 54, which in turn fits within the apertures in the sidewalls 39 of the driver block 24 (see FIG. 2) thereby enabling the camshaft to freely rotate within those apertures.

The motor within assembly 32 is bi-directional with the direction of rotation determined by electrical signals applied to connector 19. Depending upon that direction of rotation, the lead screw 40 raises or lowers the transfer block 43 in the illustrated orientation of the vibration absorber 10. Since the wrenches 46 are coupled to the transfer block 43 by pins 44, the raising and lowering action produces rotation of the camshaft 38 within the apertures of the slider and driver blocks 22 and 24. Due to the eccentricity of the central camshaft section 48 with respect to the end sections 52, rotation of the camshaft 38 causes the slider block 22 to move toward or away from the driver block 24. However, because the four flexible metal straps 26, 27, 30, and 31 connect the slider block 22 and the driver block 24 to opposite end plates 12 and 14 which are rigidly secured to the aircraft, rotation of the camshaft 38 alters the tension on those metal straps. Thus, the tension on metal straps 26, 27, 30, and 31 can be increased or decreased by operating motor assembly 32. The cover 18, holding the end plates apart (FIG. 1), maintains a preload tension on the metal straps. Alteration of the strap tension changes stiffness of the spring in the mass-spring structure and thus tunes the resonant frequency of the vibration absorber 10. This enables the absorber 10 to be tuned dynamically to different vibration frequencies within the aircraft structure.

Figure 4:
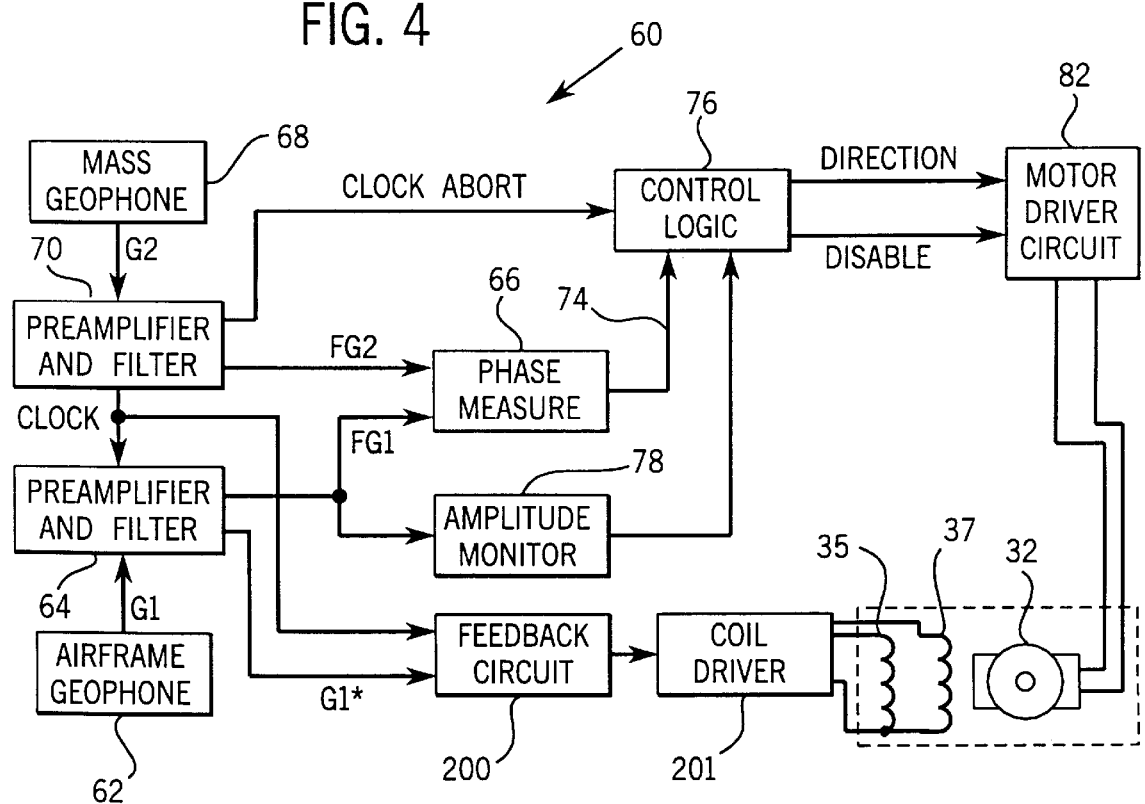
FIG. 4 is a block schematic circuit diagram of a controller for sensing airframe vibrations and adjusting the resonant frequency of the vibration absorber.

Referring to FIG. 4, the spring stiffness for the vibration absorber 10 is varied by a controller 60 in response to the sensed disturbance in the airframe. An airframe geophone 62 is attached to the first end plate 12 to sense vibration occurring along axis 33 (FIG. 2) in the airframe structural member to which that end plate is attached. Alternatively, the airframe geophone 62 could be attached directly to the structural member. This geophone has a resonance close to 28 Hz and acts as a velocity sensor above that resonant frequency. The output signal from airframe geophone 62, representing the airframe structural disturbance, is applied to an input of a first signal conditioner and filter circuit 64.

A proof-mass geophone 68 is attached to the slider block 22 of the vibration absorber, as shown in FIG. 3, to sense the vibration of the absorber proof-mass 20 along axis 33. The output signal from the mass geophone is fed to a second signal conditioner and filter circuit 70. Both the airframe and proof-mass geophones 62 and 68 may be GS14-L9 models manufactured by Geospace Corporation of Houston, Tex., USA. Alternatively, accelerometers can be used in place of these geophones.

Figure 5A:
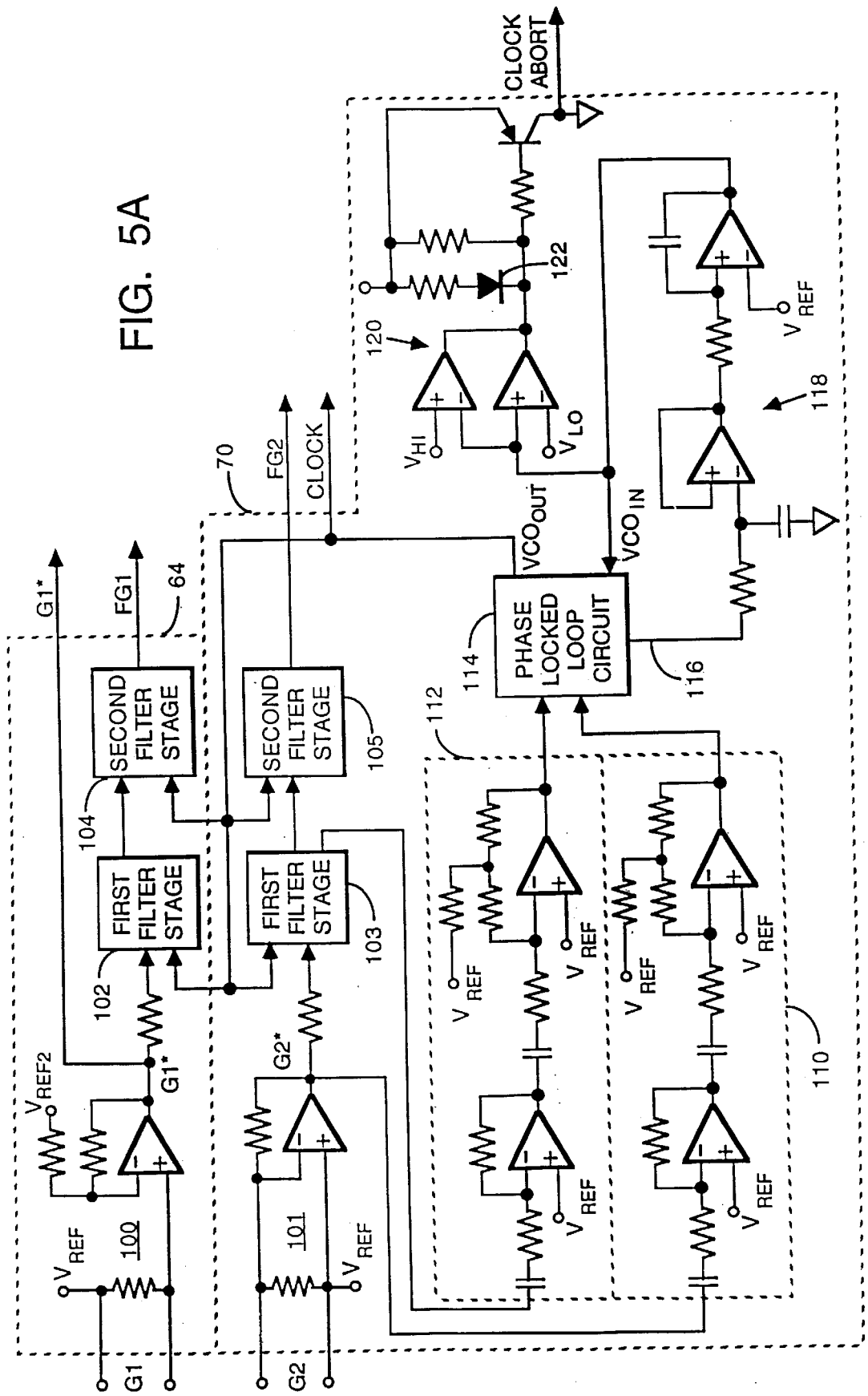
FIGS. 5A and 5B are more detailed schematic diagrams of the controller circuitry.
Figure 5B:
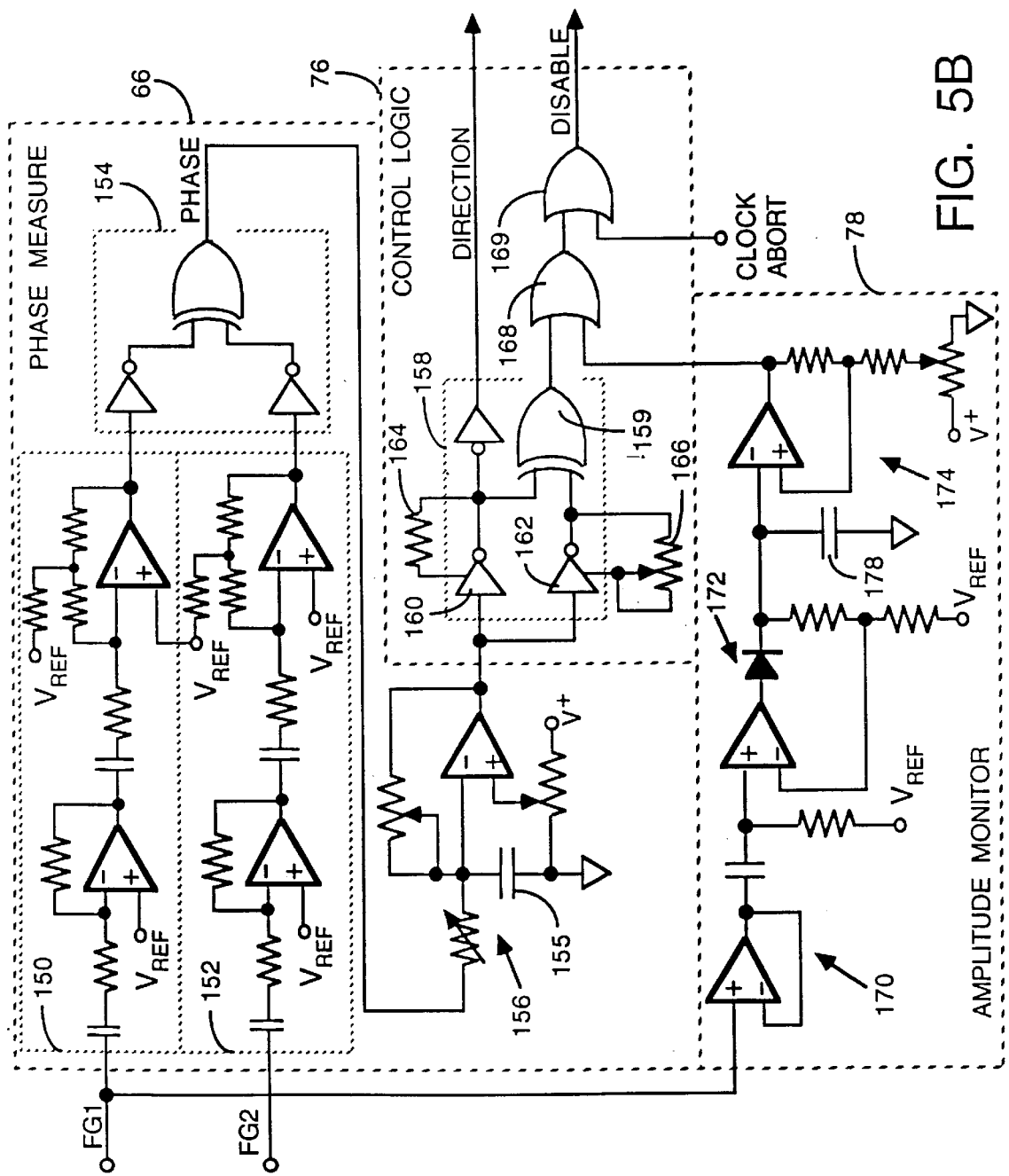

FIGS. 5A and 5B show details of the controller circuitry shown in the functional diagram of FIG. 4. The preamplifier and filter circuits 64 and 70, depicted in FIG. 5A, process both geophone signals G1 and G2 in the same manner. However, the circuit for the airframe geophone signal also contains a clock signal generator. The two geophone signals G1 and G2 are applied to separate preamplifier stages 100 and 101 with the resultant signals G1* and G2* being fed to a different first filter stage 102 and 103 respectively. The outputs of the first filter stage 102 and 103 of each geophone signal channel is applied to the input of a second filter stage 104 and 105, respectively, to produce filtered geophone signals FG1 and FG2.

The four filters stages 102–105 are bandpass types with a center frequency tuned to frequency of the vibration to be absorbed. For example, when the absorber is to be used in a propeller driven aircraft in which the blades produce airframe vibration at 100 Hz, the center frequency of these filters is tuned dynamically to that frequency. The pass band is relatively narrow to filter out disturbance from other sources, especially other harmonic signals. The four filters stages 102–105 preferably are implemented using a very high Q switched capacitor filter network, such as a LTC1060 integrated circuit manufactured by Linear Technology Corporation, in which the center bandpass frequency is set by the frequency of a clock signal, designated CLOCK. For the LTC1060 integrated circuit, the CLOCK signal is a hundred times the desired center frequency.

The first and second cascaded filter stages, which are tuned the same, aggressively filter each geophone signal to eliminate all other frequency components. One drawback of such aggressive filtering is that tuning errors can result in the desired vibration signal frequency being filtered down. To overcome this potential problem, filter stages 104–107 are electrically tuned by the CLOCK signal that is uniquely derived from a phase locked loop.

Referring still to FIG. 5A, the CLOCK signal is produced by applying the output signal G2* from mass geophone preamplifier 101 to a first precision comparator stage 110. That stage 110 compares the sinusoidal G2* signal to a reference voltage Vref to convert that signal into a square wave. The first filter stage 103 for the mass geophone signal also has a low-pass filter with a cutoff frequency tuned to the vibration frequency (e.g. 100 Hz). The output of this low-pass filter is applied to a second precision comparator stage 112 to convert the filter output into a square wave signal. Both of the precision comparator stages 110 and 112 comprise a pair of comparators connected in series to ensure true square wave conversion without clipped sinusoidal components in the resultant signal.

The two square wave signals from the pair of precision comparator stages 110 and 112 are coupled to the comparator and signal inputs of a phase locked loop circuit 114, such as a model 4046 integrated circuit. The phase difference between the two square wave signals will be ninety degrees when the circuitry is properly tuned to the vibration frequency, i.e. the CLOCK signal frequency is correct. If filter stages 102–105 are tuned low, the phase difference will be greater than ninety degrees and less than ninety degrees when the filter stages are tuned too high. The phase comparator output 116 of the phase locked loop circuit 114 is connected to an integrator stage 118 which also compares the integrated phase comparison signal to a reference voltage Vref to produce a control voltage for the voltage controlled oscillator (VCO) in the phase locked loop circuit 114. The voltage controlled oscillator produces the CLOCK signal which tunes the four switched capacitor filter stages 102–105.

Thus the first filter stage 103 in the mass geophone signal channel is part of the phase locked loop and the accuracy of that filter stage's tuning determines the CLOCK signal frequency which in turn sets the center frequency of all the filter stages. As a result, the tuning of the filter stages 102–105, and thus the performance of the control circuit as a whole, tracks changes in the vibration frequency. By adaptively tuning the pure filter stages in this manner, the controller 60 creates sinusoids from the geophone signals G1 and G2 and while accurately maintaining phase match between these two signal paths.

The control voltage for the voltage controlled oscillator within the phase locked loop circuit 114 also is checked to determine if that voltage has drifted too close to either ground or the positive supply voltage $V^+$. A window comparator 120 indicates whether the VCO control voltage is within an acceptable range bounded by voltage levels $V_{HI}$ and $V_{LO}$. When the VCO control voltage is outside this range, a light emitting diode 122 illuminates and a true CLOCK ABORT signal is produced by the preamplifier and filter circuit 70. The use of the CLOCK ABORT signal will be described subsequently.

The filtered geophone signals FG1 and FG2 from preamplifier and filter circuits 64 and 70 are applied to the phase measure circuit 66 shown in FIG. 5B. These signals pass through separate precision comparator stages 150 and 152, each comprising a pair of comparators connected in series to ensure that the filter output is converted into a square wave signal which does not have clipped sinusoidal components. The resultant signals are applied to inputs of an exclusive OR (XOR) gate 154 with Schmitt triggers at the inputs, such as a model 4583 integrated circuit. XOR gate 154 provides a pulsed signal, designated PHASE, having a variable duty cycle which is a function of the phase difference between the two processed geophone signals. At a ninety degree phase difference, the duty cycle is fifty percent. The frequency of the PHASE signal at the output of XOR gate 154 is twice the vibration frequency. The PHASE signal is amplified by a non-inverting amplifier stage 156 with adjustable gain. The capacitor 155 within amplifier stage 156 integrates the pulsed PHASE signal into a signal whose mean voltage level corresponds to the duty cycle of the pulses. That signal oscillates between its mean level. The size of the ripples depends on the RC time constant of the capacitor network. Thus the voltage level at the output of the amplifier stage 156 may vary slightly even when the vibration absorber 10 is properly tuned.

When the resonant frequency of the vibration absorber 10 matches the frequency of vibration in the airframe, the two filtered geophone signals FG1 and FG2 will be in quadrature, i.e. ninety degrees out of phase. At that time, phase measure circuit 66 produces an output voltage level, designated $V_{90}$, indicative of the quadrature relationship; for example, the nominal level of $V_{90}$ can be one-half the supply voltage to the phase measure circuit. As noted above, the actual voltage fluctuates because its corresponds to the integral of a pulse train signal.

Phase deviation of the two filtered geophone signals FG1 and FG2 from quadrature alters the output voltage from the phase measure circuit 66 whereby the magnitude of the difference between the output voltage and the quadrature voltage level $V_{90}$ indicates the magnitude of the phase difference from quadrature, and the direction of voltage difference denotes the direction of the phase shift between the geophone signals.

The output of the phase measure circuit 66 is applied to the input of the control logic 76. That input is connected to circuit section 158, such as a model 4583 integrated circuit, which has an exclusive OR (XOR) gate 159 with Schmitt triggers 160 and 162 at the inputs. The phase measure circuit output signal is applied to both of Schmitt triggers 160 and 162, the combined operation of which define a voltage range centered about the quadrature voltage level $V_{90}$. For example, one Schmitt trigger 160 may provide a positive hysteresis set at one volt above the quadrature voltage level $V_{90}$, while the other Schmitt trigger 162 is set at a negative hysteresis at one volt below the quadrature voltage $V_{90}$. Resistors 164 and 166 define the voltage range.

The output signals from the two Schmitt triggers 160 and 162 are applied to inputs of XOR gate 159. When the phase measure circuit's output voltage is outside the two-volt range centered at the quadrature voltage level $V_{90}$, the XOR gate 159 causes the output gates 168 and 169 of the control logic 76 to produce a low DISABLE signal, otherwise a true DISABLE signal is produced. As will be described, a true DISABLE signal inhibits operation of the motor assembly 32 and thus alteration of the spring stiffness for the vibration absorber. Therefore if a significant phase difference between the signals from geophones 62 and 68 occurs, the phase measure output signal will be outside the deadband of the XOR gate 159 resulting in activation of the motor assembly 32. Circuit section 158 prevents the normal ripple in the phase measure output signal about the quadrature voltage level $V_{90}$ from altering the tuning of the vibration isolator 10.

The output from one of the Schmitt triggers 160 in circuit section 158 is used as a DIRECTION signal which indicates the direction that the motor assembly 32 should move to adjust the vibration absorber tuning.

The control logic 76 also produces a high DISABLE signal in response to a signal from an amplitude monitor 78 which receives signal FG2 produced by the airframe geophone preamplifier and filter circuit 64. The FG2 signal passes through a buffer stage 170 and an amplifier stage 172 which applies a positive gain to positive signal levels and zero gain to negative signal levels. Capacitor 173 integrates the resultant signal at the output of the amplifier stage 172. The integrated signal is fed to a comparator stage 174 that produces an output which is applied to a first OR gate 168 in order to produce the DISABLE signal at the output of a second OR gate 169.

Therefore, if the amplitude of the airframe geophone signal G1 becomes too small to provide reliable tuning of the vibration absorber 10, the amplitude monitor 78 causes drive logic 76 to produce a high DISABLE signal. That action inhibits alteration of the vibration isolator tuning under such conditions. The CLOCK ABORT signal from the preamplifier and filter circuit 70 is applied to one input of OR gate 169 to produce a high DISABLE signal when the CLOCK signal frequency drifts too far.

Referring again to FIG. 4, the DISABLE and DIRECTION signals are coupled to a conventional motor driver 82. The motor driver 82 responds to these signals by producing power signals for operating the motor in assembly 32 to tune the resonant frequency of the vibration absorber 10.

When the vibration absorber 10 is properly tuned to the frequency of airframe vibration, the signals from the geophones 62 and 68 are in quadrature. This signal state causes the controller 60 to produce a high DISABLE signal which inhibits the motor driver 82 from operating the motor assembly 32. When the vibration absorber 10 is not properly tuned, the signals from the airframe and proof-mass geophones 62 and 68 will be out of quadrature. This condition results in the phase measure circuit output signal being outside the deadband set by the Schmitt triggers 160 and 162 in the control logic 76. As a consequence, the control logic 76 produces a low DISABLE signal which enables the motor driver 84 to produce a drive signal for the motor within the motor assembly 32. That drive signal causes the motor to move in the direction specified by the DIRECTION signal from the drive logic 76.

The motor assembly 32 turns the lead screw 40 which moves wrenches 46 and 47 and camshaft 38 to alter the spacing between the slider block 22 and the driver block 24. This movement of the two blocks 22 and 24 changes the tension on the flexible metal straps 26, 27, 30 and 31, thereby changing the stiffness of the spring in the vibration absorber 10. This change in the spring stiffness alters the resonant frequency of the vibration absorber until it matches the frequency of vibration of the airframe structural member. When that match occurs, the signals from the two geophones 62 and 68 once again will be in quadrature causing the controller 60 to produce a high DISABLE signal thereby terminating operation of the motor assembly 32.

In this manner, the controller 60 operates motor assembly 32 to dynamically adjust the resonant frequency of the vibration absorber 10 to track variations in vibration frequency resulting from changes in aircraft engine speed. In addition the system compensates for variation in resonant frequency which result from changes in temperature or material aging. By means of this adaptive tuning, the mass-spring system of vibration absorber 10 provides high quality factor resonance at the precise disturbance frequency.

Because the performance of the vibration absorber depends upon mass, a critical parameter in any aerospace application, an adaptive feedback adjunct to the mass-spring mechanical system is provided to enhance effectiveness of the absorber at the fundamental resonant frequency and extend performance to reduce higher harmonics of the disturbance. With reference to FIGS. 2 and 4, the feedback portion of the controller 60 includes feedback circuit 200 which receives the preamplified airframe geophone signal G1*, voice coil drivers 201, the voice coils 35 and 37 attached inside cover 18 and permanent magnets 41 and 42 glued to the upper and lower surfaces of the proof-mass 20. The current flowing through the pair of voice coils 35 and 37 interacts with the magnetic field from the permanent magnets 41 and 42 which creates a Lorentz force that enhances the impedance of the absorber to the vibration.

Derivation of the closed loop impedance of the absorber base formed by the end plates 12 and 14 is beneficial to understanding the philosophy of the feedback design. That closed loop base impedance is the dynamic ratio of base force over base velocity with the feedback active. First assume that the absorber is fixed-tuned. Denoting the base velocity as V(s) with s being the Laplace variable, and the mechanical impedance of the absorber base as Z(s), the equations of motion for the system are:

$$F(s) = Z(s)V(s) + \frac{ms^2}{ms^2 + cs + k}f(s)$$

$$Z(s) = \frac{ms(cs + k)}{ms^2 + cs + k}$$

where m is the proof mass, c represents the viscous damping, and k is the stiffness of the idealized absorber. Because the system is passive, the phase of this impedance remains between ±90°.

Using a feedback law of the type:

$$f(s) = \frac{L(s)}{s} V(s)$$

the closed loop relationship between F(s) and V(s), i.e. the closed loop absorber base impedance, becomes:

$$Z_{cl}(s) = \frac{F(s)}{V(s)} = \frac{ms}{ms^2 + cs + k}(cs + k + L(s))$$

By properly selecting L(s), $Z_{cl}$ can be guaranteed to have a phase between ±90° and thus will behave dynamically as a passive device. This property ensures stable interaction of several absorbers mounted on a passive structure and the feedback design ignores any dynamics information about the supporting structure.

The feedback law comprises several terms including:

the first harmonic: $L_1 = h(cs + k)$ the second harmonic: $L_2 = \frac{m_2}{m} \frac{s^2 + cs + k}{m_2 s^2 + c_2 s + k_2}$ the third harmonic: $L_3 = \frac{m_3}{m} \frac{s^2 + cs + k}{m_3 s^2 + c_3 s + k_3}$ The second harmonic is resonance at twice the fundamental (or first harmonic) frequency, while the third harmonic is resonance at thrice the fundamental frequency.

Considering only the fundamental frequency, the closed loop base impedance becomes:

$$Z_{cl}(s) = \frac{ms(cs + k)}{ms^2 + cs + k}(1 + h) = (1 + h)Z(s)$$

The feedback on the fundamental frequency has the effect of increasing the apparent moving mass by a factor of 1+h.

Considering only the second harmonic, the closed loop base impedance of an absorber mass $m_2$ becomes:

$$Z_{cl}(s) = \frac{m_s s(c_2 s + k_2)}{m_2 s^2 + c_2 s + k_2}$$

The stiffness $k_2$ is selected to put the resonance at twice the fundamental and the viscous damping $c_2$ is selected to give the mode the proper resonance or quality factor. Hence, the feedback law emulates a passive resonant absorber tuned to the second harmonic of the vibration disturbance by using the absorber as a shaker. The same applies to the third harmonic. Note that both the pole and the zero of filter term $L_2$ must adapt when the absorber's resonant frequency is changed by the adaptation logic.

In a real absorber system, implementation of the ideal feedback law must take into account actuator and sensor dynamics, the static and dynamic limitations of electronic components and to some extent structural dynamics of the supporting structure. These less than ideal features make it impossible to actually realize a "passive" closed loop absorber base impedance over the entire frequency band, i.e. a closed-loop impedance with phase within ±90°. Therefore, the actual feedback loop implementation should guarantee the impedance to be passive where the gain is high for vibration absorption, and should guarantee that the feedback gain is small in the frequency range where the phase cannot be kept with in the desired ±90° bounds. Thus the present absorber system is phase stabilized near the fundamental frequency and the second and third harmonics of the disturbance, and gain stabilized outside the performance frequency band.

Figure 6:
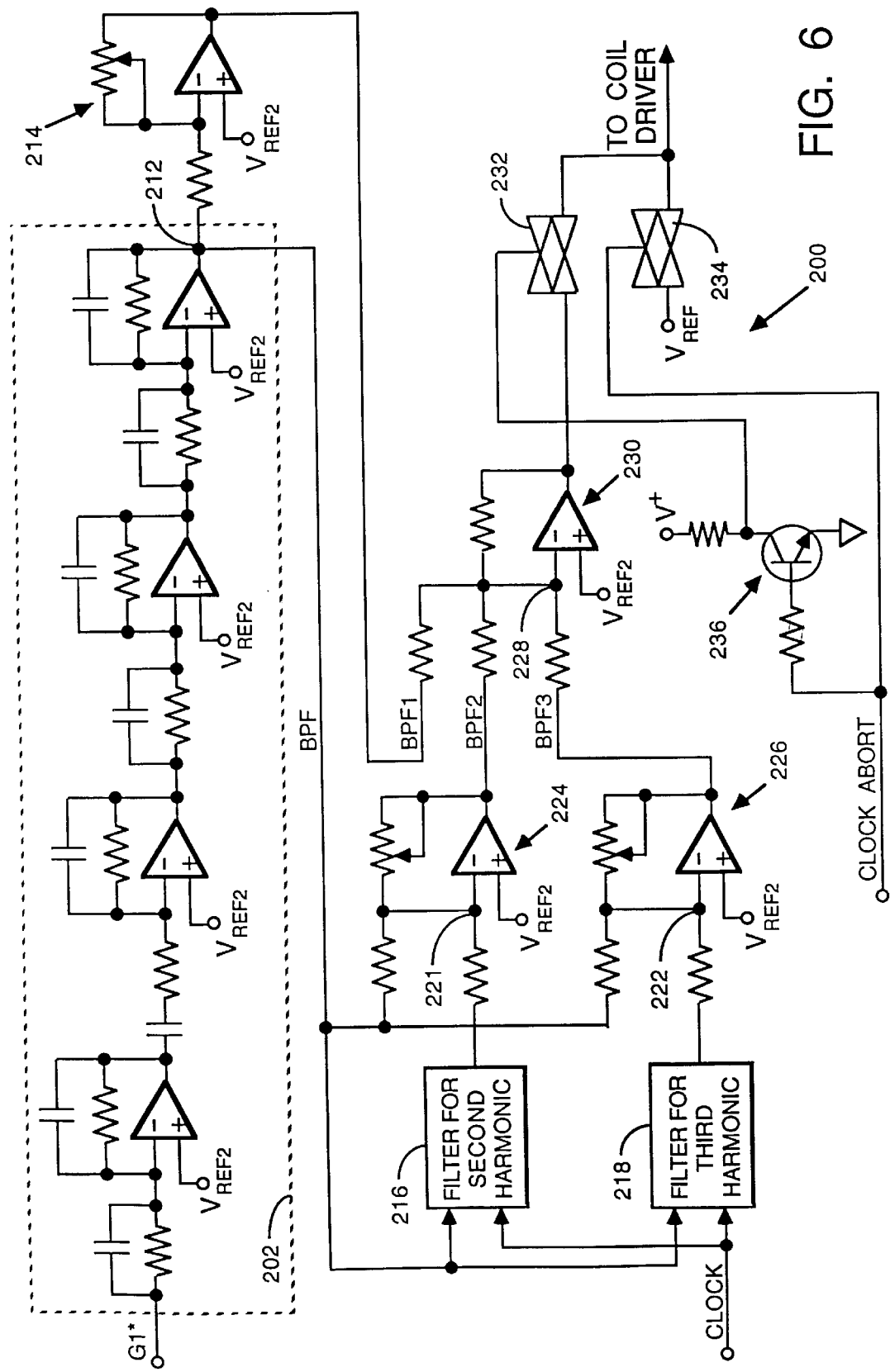
FIG. 6 is a detailed schematic diagram of the feedback signal processing circuit in the controller.

With reference to FIG. 6, the feedback circuit 200 of the controller 60 includes a four stage filter 202 formed by a series of fixed low and high pass filters that receives the preamplified airframe geophone signal G1*. The band-pass filter 202 provides necessary feedback loop shaping and stability. Specifically, the resonance of the airframe geophone 62 at 28 Hz adds excessive lead to the feedback loop at the low frequency cross-over region (e.g. 50 Hz) for which compensation must be provided. The coil L-R pole also has to be canceled as it adds excessive lag in the high frequency cross-over region (e.g. 500–700 Hz). The signal integrator is high-pass filtered at about five Hertz to avoid amplifying the DC bias and low frequencies. The output of the fixed four stage filter 202 at node 212 is designated BPF and is amplified by an amplifier stage 214 to provide a gain adjusted signal designated BPF1.

The band-pass filter output signal BPF is applied to inputs of a pair of switched capacitor filters 216 and 218 configured as high quality factor, second order filters. These filters, which may be formed by LTC1060 integrated circuits for example, also receive the CLOCK signal as a tuning reference frequency. One switched capacitor filter 216 is configured with a pass band centered at the second harmonic (e.g. 200 Hz) of the vibration disturbance frequency (e.g. 100 Hz), while the other switched capacitor filter 218 is configured with a pass band centered at the third harmonic (e.g. 300 Hz). The tuning of filters 216 and 218 is changed by the clock signal to track changes in the vibration disturbance frequency in the same manner as filter stages 102–105 were dynamically tuned. Although the present system utilizes high order harmonic frequencies of the vibration disturbance frequency, subharmonic frequencies may be utilized.

The output of each switched capacitor filter 216 and 218 is individually summed with the band-pass filter signal BPF at nodes 221 and 221, respectively. Amplifiers 224 or 226 adjust the gain of each higher harmonic signal BPF2 and BPF3 for proper summation at node 228 with a gain adjusted signal BPF1 for the fundamental (first harmonic) frequency.

The summation of the three disturbance signals BPF1, BPF2 and BPF3 is amplified by stage 230 and is applied via a first output switch 232 to the voice coils 35 and 37. The first output switch 232 operates in conjunction with a second output switch 234 that alternately applies constant reference voltage Vref to the voice coils 35 and 37. The conductivity of the output switches 232 and 234 is controlled by the CLOCK ABORT signal. The first and second output switches 232 and 234 have opposite conductivity at any point in time, wherein the second output switch 234 is controlled directly by the CLOCK ABORT signal and the first output switch 232 responds to the inversion of the CLOCK ABORT signal produced by transistor 236.

When the CLOCK signal, which tunes switched capacitor filters 102–105, 216 and 218, drifts too far for reliable operation, the CLOCK ABORT signal goes true, as described previously. In that case, operation of the two voice coils 35 and 37 is suspended by clamping the output from the feedback circuit 200 to a constant voltage level.

During normal operation, the CLOCK ABORT signal is low causing the output signal from amplifier stage 230 to be applied via a voltage driver 201 in FIG. 4 to the conductor of each voice coils 35 and 37. The resultant alternating electric current flowing through the voice coils has an instantaneous direction and intensity that interacts with the moving magnetic field from the permanent magnets 41 and 42 on the proof-mass 20, see FIG. 2. This interaction of the electric and magnetic fields produces a force, according to the Lorentz equation, which acts on the proof-mass 20 along the axis 33 of the vibration. Because the current in each straight section of a voice coil 35 or 37 flows in opposite directions with respect to the proof-mass 20, the permanent magnets 41 or 42 associated with those straight sections are oppositely poled so that the forces are cumulative. Thus the force produced by the feedback circuit counteracts the vibration movement and enhances the impedance of the mass-spring assembly to the vibration disturbance in the airframe. Since the output current from the coil contains alternating components at the fundamental vibration frequency as well as second and third harmonics of that fundamental frequency, reduction of vibration at those frequencies is enhanced by the feedback adjunct to the mechanical mass-spring absorption system.

The foregoing description is directed to the preferred embodiment of the present invention. Although some attention was given to various alternatives within the scope of the invention, it is anticipated that skilled artisans will likely realize additional alternatives that are now apparent from the disclosure of those embodiments. For example, even though the vibration absorber is being described in the context of use in an aircraft, the invention has application in other types of structures that are subjected to vibration. Accordingly, the scope of the invention should be determined from the following claims and not limited by the above disclosure.

We claim:

1. A vibration absorber, for a body in which a vibrational disturbance occurs at a given frequency, said vibration absorber comprising:
    a mechanical resonator having a member for attachment to the body, a mass, and a spring connecting the mass to the member, wherein said mechanical resonator resonates at substantially the given frequency to counteract the vibrational disturbance in the body;
    a magnet attached to the mass and producing a first magnetic field;
    a sensor which produces a sensor signal indicating vibration due to the vibrational disturbance;
    a feedback circuit connected to the sensor to receive the sensor signal and produce an output signal having first component frequency substantially equal to a harmonic of the given frequency; and
    a conductor connected to the feedback circuit to carry the output signal and being mounted adjacent to one side of said mass so that a magnetic field produced by the output signal flowing through the conductor interacts with the magnetic field from the magnet to generate a force that acts on said mass thereby increasing an impedance of the vibration absorber to the vibrational disturbance.

2. The vibration absorber as recited in claim 1 wherein said magnet is a permanent magnet.

3. The vibration absorber as recited in claim 1 wherein said mechanical resonator is adaptively tuned to resonate at substantially the given frequency.

4. The vibration absorber as recited in claim 1 wherein said conductor is a first voice coil.

5. The vibration absorber as recited in claim 4 wherein said first voice coil has first and second straight sections; and said magnet comprises a first permanent magnet attached to said mass adjacent to the first straight section of the voice coil with a north pole facing said first voice coil, and a second permanent magnet attached to said mass adjacent the second straight section of the voice coil with a south pole facing said first voice coil.

6. The vibration absorber as recited in claim 5 further comprising:
    a second voice coil adjacent to another side of the mass and having third and fourth straight sections; and
    wherein said magnet comprises a third permanent magnet fixed to said mass adjacent to the third straight section and having a north pole facing said second voice coil, and a fourth permanent magnet fixed said mass adjacent to the fourth straight section and having a south pole facing the second voice coil.

7. The vibration absorber as recited in claim 1 wherein the first component frequency produced by said feedback circuit is substantially the given frequency.

8. The vibration absorber as recited in claim 7 wherein the output signal produced by said feedback circuit has a second component frequency substantially equal to a non-unity multiple of the given frequency.

9. The vibration absorber as recited in claim 7 wherein the output signal produced by said feedback circuit has a second component frequency substantially equal to twice the given frequency.

10. The vibration absorber as recited in claim 9 wherein the output signal produced by said feedback circuit has a third component frequency substantially equal to three times the given frequency.

11. The vibration absorber as recited in claim 1 wherein said feedback circuit comprises:
    a first filter having an input which receives a signal derived from the sensor signal and having an output, said first filter having a pass band that includes a second harmonic of the given frequency;
    a second filter having an input which receives the signal derived from the sensor signal and having an output, said second filter having a pass band that includes a third harmonic of the given frequency; and
    a summing amplifier connected to said sensor, the output of the first filter and the output of the second filter, and producing the output signal which has frequency components corresponding to the given frequency, the second harmonic of the given frequency and the third harmonic of the given frequency.

12. An absorber for a vibrational disturbance which occurs at a given frequency in a body, said absorber comprising:
    a resonator having first and second members for attachment to the body, a mass connected by a first spring to the first member and by a second spring to the second member;
    a first magnet attached to one side of the mass and producing a first magnetic field;
    a second magnet attached to another side of the mass and producing a second magnetic field;
    a first sensor which produces a first sensor signal indicating vibration due to the vibrational disturbance;

a feedback circuit having an input that receives the first sensor signal and having an output at which is produced a coil signal having first component frequency substantially equal to a harmonic of the given frequency;

a first voice coil connected to output of the feedback circuit and mounted adjacent to the first magnet so that a third magnetic field produced by the output signal flowing through the first voice coil interacts with the first magnetic field to generate a force that acts on said mass thereby increasing an impedance of said absorber to the vibrational disturbance; and a second voice coil connected to output of the feedback circuit and mounted adjacent to the second magnet so that a fourth magnetic field produced by the output signal flowing through the second voice coil interacts with the second magnetic field to generate a force that acts on said mass thereby increasing an impedance of the absorber to the vibrational disturbance.

13. The absorber as recited in claim 12 wherein:

said first voice coil has first and second straight sections;

said first magnet comprises a first permanent magnet fixed to said mass adjacent to the first straight section and having a north pole facing said first voice coil, and a second permanent magnet fixed to said mass adjacent to the second straight section and having a south pole facing said first voice coil;

said second voice coil has third and fourth straight sections; and said second magnet comprises a third permanent magnet fixed to said mass adjacent to the third straight section and having a north pole facing said second voice coil, and a fourth permanent magnet fixed to said mass adjacent to the fourth straight section and having a south pole facing said second voice coil.

14. The absorber as recited in claim 12 wherein the first component frequency of the output signal produced by said feedback circuit is substantially the given frequency; and the output signal produced also contains a second component frequency substantially equal a non-unity multiple of the given frequency.

15. The absorber as recited in claim 12 wherein said feedback circuit comprises:

a second order filter with a pass band centered at a second harmonic of the given frequency, and having an input which receives a signal derived from the sensor signal and having an output;

another second order filter with a pass band centered at a third harmonic of the given frequency, and having an input which receives a signal derived from the sensor signal and having an output; and a summing amplifier connected to said sensor and to the output of each second order filter, and producing the output signal which has frequency components corresponding to the given frequency, the second harmonic of the given frequency and the third harmonic of the given frequency.

16. The absorber as recited in claim 12 wherein the mass has a first block and a second block; and said resonator further comprises a mechanism which responds to a control signal by varying a distance between the first and second blocks to thereby alter stiffness of the first and second springs.

17. The absorber as recited in claim 16 further comprising a control circuit which receives the signal from said sensor and produces the control signal that causes said mechanism to adjust the stiffness of said spring so that the spring and the mass resonate to absorb the vibrational disturbance.

18. The absorber as recited in claim 16 further comprising:

a second sensor which produces a second sensor signal indicating the vibration of the mass; and a control circuit which comprises:
 (a) a first sensor filter which receives the first sensor signal and produces a first filtered signal;
 (b) a second sensor filter which receives the second sensor signal and produces a second filtered signal;
 (c) a phase comparator which produces a phase output signal indicating a phase relationship between the first and second filtered signals; and
 (d) control logic which produces the control signal for the mechanism in response to the phase output signal from said phase comparator.

19. The absorber as recited in claim 18 wherein both the first and second sensor filters have a filter frequency that is tuned by a clock signal; and further comprising a clock signal generator which produces the clock signal in response to one of the first and second sensor signals and one of the first and second filtered signals.

20. The absorber as recited in claim 19 wherein said feedback circuit comprises:

a first filter having a one input which receives the sensor signal, another input which receives the clock signal, and an output, said first filter has a pass band with a center frequency that is varied in response to the clock signal to coincide with a second harmonic of the given frequency;

a second filter having an input which receives the sensor signal, another input which receives the clock signal, and an output, said second filter having a pass band with a center frequency that is varied in response to the clock signal to coincide with a third harmonic of the given frequency;

a summing amplifier connected to said sensor, the output of the first filter and the output of the second filter, and producing the output signal which has frequency components corresponding to the given frequency, the second harmonic of the given frequency and the third harmonic of the given frequency.

* * * * *